United States Patent

Alm

[15] 3,688,551
[45] Sept. 5, 1972

[54] HYDRAULIC BLIND RIVET GUN

[72] Inventor: Gerald F. Alm, Rte. 1, Box 7, Grangeville, Idaho 83530

[22] Filed: Feb. 16, 1971

[21] Appl. No.: 115,439

[52] U.S. Cl. ............................72/391, 72/453
[51] Int. Cl. ..............................................B21d 9/05
[58] Field of Search......................72/391, 114, 453

[56] References Cited

UNITED STATES PATENTS

| | | | |
|---|---|---|---|
| 2,053,716 | 9/1936 | Huck | 72/391 |
| 3,451,248 | 6/1969 | Bell | 72/391 |
| 3,528,277 | 9/1970 | Perkins | 72/391 |

*Primary Examiner*—Charles W. Lanham
*Assistant Examiner*—Gene P. Crosby
*Attorney*—Clarence A. O'Brien and Harvey B. Jacobson

[57] ABSTRACT

A blind rivet gun having a hydraulic cylinder including inner and outer radially spaced concentric cylinder sleeves and an intermediate tubular piston. A cover plate is provided and engaged with one end of the piston and extends across the corresponding ends of the inner and outer cylinder sleeves and supports the head of a blind rivet. Also, the pin of a blind rivet is supported within the inner cylinder sleeve for shifting of the rivet head relative thereto upon shifting of said tubular piston between said cylinder sleeves.

6 Claims, 5 Drawing Figures

PATENTED SEP 5 1972
3,688,551
SHEET 1 OF 2
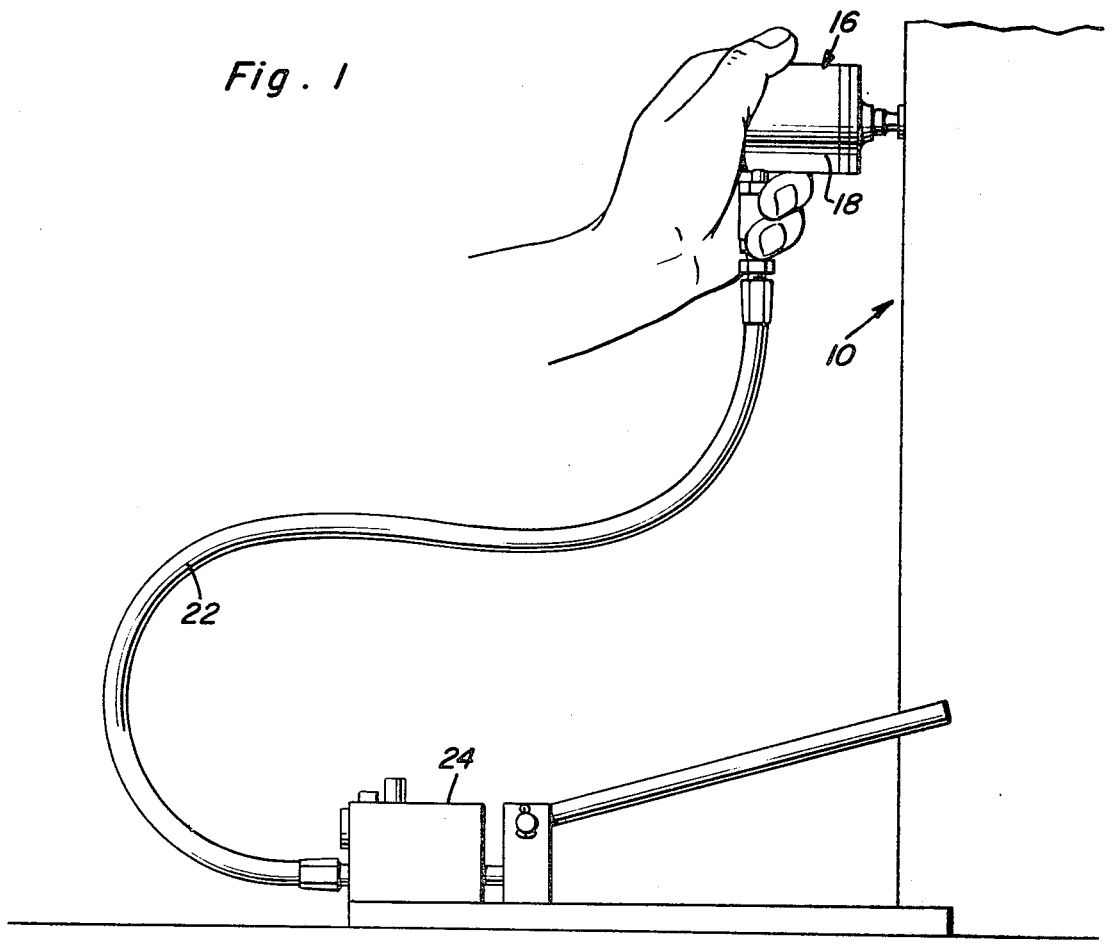
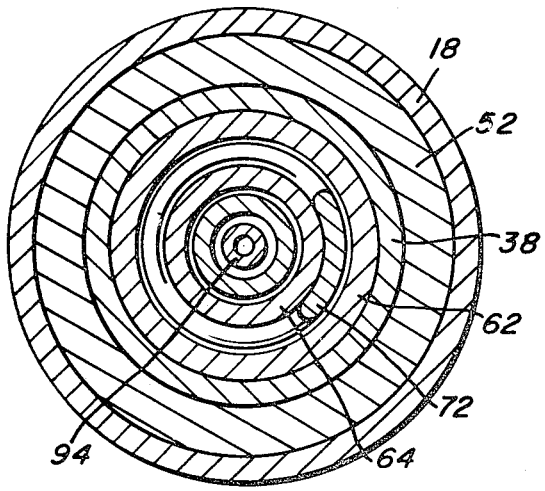
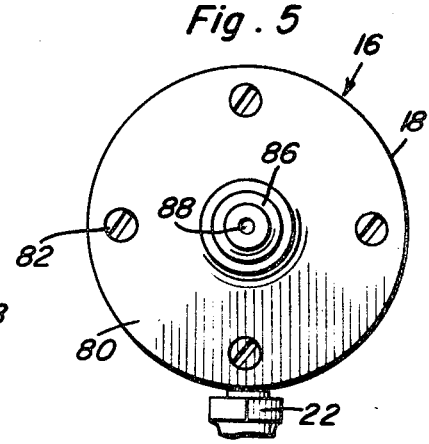
Gerald F. Alm
INVENTOR.
BY Clarence A. O'Brien
and Harvey B. Jacobson
Attorneys Gerald F. Alm
INVENTOR BY Clarence A. O'Brien
and Harvey B. Jacobson
Attorneys

HYDRAULIC BLIND RIVET GUN

The hydraulic blind rivet gun of the instant invention has been designed primarily the use in expanding the free sleeve ends of blind rivet sleeves. Conventionally, blind rivets include sleeve bodies provided with enlarged heads at one end and an expanding pin slidable through the sleeve body and including an enlargement on its end remote from the corresponding sleeve head for expanding the adjacent free end of the sleeve body of the rivet. The pin extends completely through the rivet body and a rivet expanding tool is provided including a tubular nosepiece and an expanding pin gripping assembly reciprocal along the centerline of the passage formed through the nosepiece and disposed behind the latter. Conventionally, mechanical means are provided for causing relative movement between the tubular nosepiece and the expanding pin gripping assembly whereby the pin of the rivet may be pulled through the latter in order that the enlarged end of the pin may expand the end of the tubular rivet body remote from the head thereof.

Hand tools provided for expanding blind rivets are conventionally of the lever-actuated type including a pair of relatively swingable levers which are squeezed together in order to effect the necessary relative movement between the tubular nosepiece and the pin-gripping assembly to expand an associated blind rivet. Also, other rivet expanding devices, including power operated devices have been heretofore designed. However, in addition to a requirement for a tool to effect the necessary relative shifting between the expanding pin and the tubular rivet body, in order to properly rivet a plurality of workpieces together by utilizing blind rivets, it is necessary that the head of the body sleeve of the rivet have its undersurface urged into tight frictional engagement with the opposing workpiece.

Accordingly, the rivet gun of the instant invention includes a body portion which is stationary relative to the expanding pin-gripping assembly of the gun and also adapted to be held in the hand of the user while the nosepiece supporting portion of the gun is shiftable relative to the body portion thereof to be hand-held. By this construction the nosepiece engaging the head of the rivet sleeve body is thrust forward relative to the rivet expanding pin-gripping assembly, as opposed to the latter being shifted rearwardly relative to a nosepiece stationarily supported relative to a handle portion of the gun, and in this manner each time the gun is actuated the nosepiece is thrust forward to ensure that the head of the rivet is tightly seated against the opposing workpiece surface and the head of the rivet being expanded is thereby maintained in tight seated engagement with the opposing workpiece surface throughout the blind rivet expanding operation.

The main object of this invention is to provide a blind rivet gun of the powered type which will not only function to expand and set blind rivets, but which will also, when hand-held, tend to ensure that the head of the associated blind rivet is tightly abutted against the opposing workpiece.

Another object of this invention, in accordance with the immediately preceding object, is to provide a powered blind rivet gun of a size and shape to be readily utilized in confined work areas.

A final object of this invention to be specifically enumerated herein is to provide a blind rivet gun which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is an elevational view of the blind rivet gun illustrated as being hand-held in position to set an associated blind rivet;

FIG. 4 is a transverse vertical sectional view taken substantially upon the plane indicated by the section line 4—4 of FIG. 2; and FIG. 5 is a front elevational view of the blind rivet gun.

Figure 2:
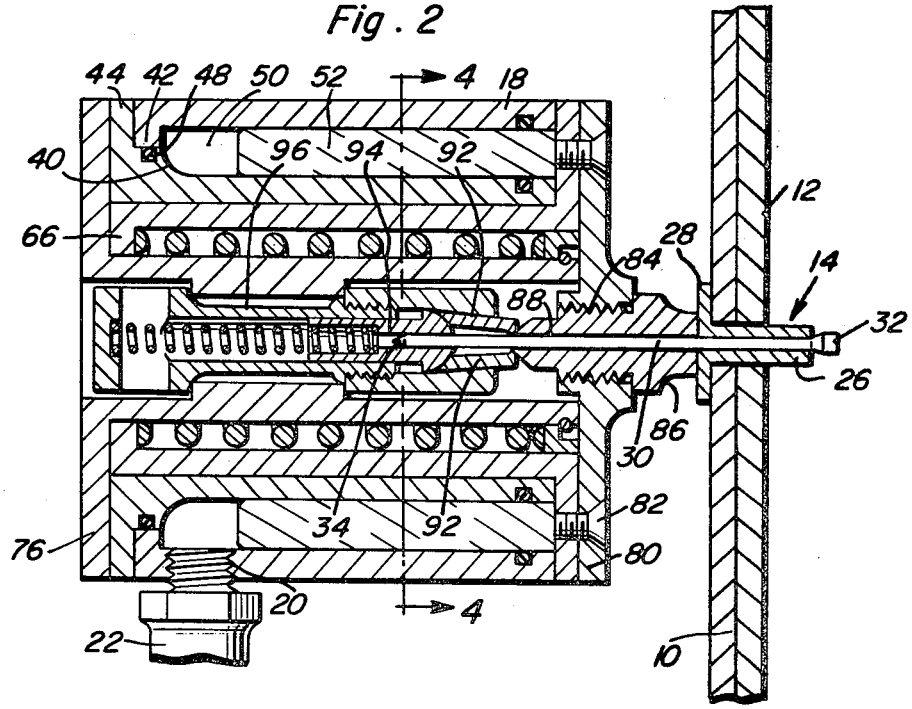
FIG. 2 is an enlarged fragmentary vertical sectional view taken substantially upon a plane passing through the longitudinal centerline of the gun illustrated in FIG. 1 and with the gun in readiness to set the associated blind rivet.

Referring now more specifically to the drawings the numeral 10 generally designates an outer panel member or workpiece to which an inner workpiece 12 is to be secured by means of a blind rivet assembly referred to in general by the reference numeral 14.

The blind rivet gun of the instant invention is referred to in general by the reference numeral 16 and includes an outer sleeve 18 defining a body portion of the gun 16 adapted to be hand held in the manner illustrated in FIG. 1. The outer sleeve 18 is provided with a threaded port 20 in which a threaded end of a fluid pressure line 22 is threadedly engaged. The remote end of the fluid pressure line 22 is communicated with the outlet port of a hydraulic pump assembly 24. The hydraulic pump assembly 24 may be of the power actuated type or hand actuated type, as illustrated, and if desired, the gun 16 may be actuated by a gas under pressure such as air supplied from a source (not shown) of air under pressure utilized in lieu of the hydraulic pump assembly 24.

The blind rivet 14 includes a sleeve body 26 having a head 28 on one end and a sleeve expanding pin 30 is provided and is slidable through the body 26. The pin 30 has an enlarged head 32 on the end thereof remote from the head 28 and the end of the pin 30 remote from the head 32 is pointed as at 34. The blind rivet 14 is conventional in design in that the pin 30 may be shifted to the left as viewed in FIG. 3 of the drawings to force the head 32 thereof into the adjacent end of the sleeve body 26 in order to expand that sleeve end as at 36 on the side of the workpiece 12 remote from the workpiece 10 thereby securing the two workpieces together.

The gun 16 includes an inner sleeve 38 disposed within the outer sleeve 18 and the inner sleeve 38 includes a diametrically enlarged first rear end portion 40 which is snugly received within a radially inwardly projecting annular shoulder portion 42 carried by the rear end of the outer sleeve 18. In addition, the inner sleeve 38 includes a second diametrically enlarged portion 44 against whose forward face the rear end of the outer sleeve 18 is abutted and the first diametrically enlarged portion 40 of the inner sleeve 38 includes a circumferential groove 46 in which a sealing O-ring 48 is disposed thereby forming a fluid-tight seal between the first diametrically enlarged end portion 40 and the shoulder portion 42 of the inner and outer sleeves 38 and 18.

An annular pressure chamber 50 is defined between the forward end portions of the inner and outer sleeves 38 and 18 and a piston sleeve 52 has its rear end portion telescoped into the forward portion of the pressure chamber 50. The forward ends of the inner and outer sleeves 38 and 18 include outside and inside circumferential grooves 54 and 56, respectively, in which sealing O-rings 58 and 60 are seated thereby forming fluid-tight seals between the inner and outer sleeves 38 and 18 and the piston sleeve 52 adjacent the forward ends of the inner and outer sleeves.

An outer spring retainer sleeve 62 is snugly and slidably received within the inner sleeve 38 and an inner spring-retaining sleeve 64 is disposed within the outer spring-retaining sleeve 62. The outer sleeve 62 includes a rear end radially inwardly projecting circumferential shoulder 66 which is guidingly engaged on the outer surfaces of the inner spring-retaining sleeve 64 and a spring-retaining ring 68 is secured on the forward end of the inner spring-retaining sleeve 64, by means of a retainer 70 and the ring 68 is slidingly engaged with the inner surfaces of the outer spring-retaining ring 62.

A compression spring 72 is disposed about the inner spring-retaining sleeve 64 within the outer spring-retaining sleeve 62 with its opposite ends bearing upon the shoulder 66 of the sleeve 62 and the ring 68 carried by the sleeve 64 and thus the spring 72 urges the outer spring-retaining sleeve 62 rearward relative to the inner spring-retaining sleeve 64.

The rear end of the inner spring-retaining sleeve 64 includes a circumferentially extending radially outwardly projecting shoulder or flange 76 against whose forward face the rear end face of the inner sleeve 38 is abutted and the forward end of the outer spring-retaining sleeve 62 includes a circumferentially extending radially outwardly projecting shoulder or flange 78 to whose forward face a front wall 80 is secured by means of suitable fasteners 82. The forward end face of the piston sleeve 52 abuts the rear face of the shoulder or flange 78 and the central portion of the front wall 80 is provided with a threaded bore 84 in which a tubular nosepiece 86 is removably threadedly engaged. The nosepiece 86 has a central bore 88 formed therethrough through which the sleeve expanding spring 30 is slidingly received and a rivet expanding pin gripping assembly referred to in general by the reference numeral 90 is secured within the inner spring retaining sleeve 64.

Figure 3:
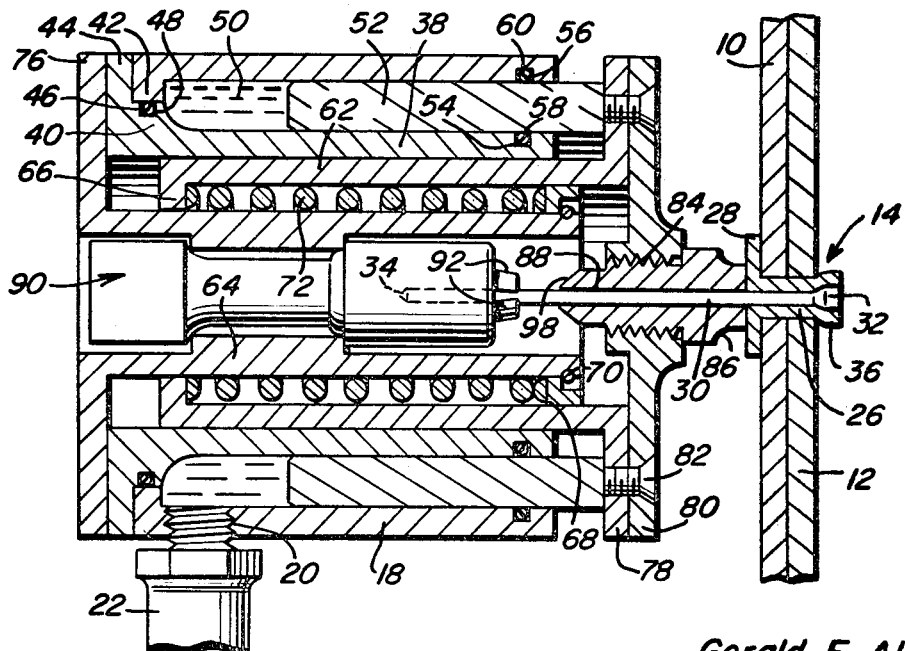
FIG. 3 is a vertical sectional view similar to FIG. 2 but with the relatively movable components of the gun in position after having set the associated blind rivet.

As may best be seen from FIG. 2 of the drawings the assembly 90 includes a plurality of jaw members 92 which are acted upon by a spring-urged follower 94 disposed within the body 96 of the assembly 90 and the jaws 92 are operable to tightly frictionally grip the rear end of the pin 30 disposed therebetween upon rearward displacement of the assembly 90 relative to the nosepiece 86 in order to pull the pin 30 to the left from the position thereof illustrated in FIG. 2 of the drawings to the position thereof illustrated in FIG. 3 of the drawings in order to expand the sleeve body 26 as at 36. Further, the jaw members 92 are engageable with the wedge surface 98 formed about the rear end of the nosepiece 86 disposed within the forward end of the inner spring-retaining sleeve 64 upon forward displacement of the latter relative to the nosepiece 86 for releasing the pin 30 after it has expanded the sleeve body 26 as at 36.

In operation, and with the outer spring-retaining sleeve 62 displaced to the rear as illustrated in FIG. 2 of the drawings and with the nosepiece 86 of the gun 16 facing upwardly, the rivet 14 may be supported from the nosepiece 86 in the manner illustrated in FIG. 2 of the drawings after which the gun 16 may be positioned to insert the sleeve body 26 of the rivet 14 through the bores formed in the workpieces 10 and 12. Then, the pump assembly 24 may be actuated in order to discharge fluid under pressure into the chamber 50 whereupon the sleeves 38 and 18 will be displaced rearwardly against the pressure of the person's hand holding the outer sleeve body 18 of the gun 16 with the result that the nosepiece 86 will be displaced forwardly to insure that the head 28 of the rivet 14 is tightly frictionally engaged with the outer surface of the workpiece panel 10. Continued rearward movement of the sleeves 18 and 38 will of course cause the assembly 90 to be displaced rearwardly and the latter, because of the grip of the jaw members 92 on the pin 30, to displace the pin 30 from the position thereof illustrated in FIG. 2 of the drawings to the position thereof illustrated in FIG. 3 of the drawings in order to expand the sleeve body 26 as at 36 thereby securing the workpieces 10 and 12 together. Final movement of the sleeves 18 and 38 to the left as viewed in FIGS. 2 and 3 of the drawings relative to the nosepiece 86 will of course cause the left hand end of the pin 30 to be broken from the right hand end thereof extending through the sleeve body 26 and thereafter the fluid pressure within the chamber 50 may be relieved in order that the spring 72 may return the sleeves 38 and 18 to the right relative to the nosepiece 86 so that the various components of the gun 16 are in the positions thereof illustrated in FIG. 2 of the drawings with the jaw members 92 engaged with the wedge surfaces 98 and displaced to the rear within the assembly 90 to release the portion of the pin 30 engaged thereby. At this point, the gun 16 may be removed from the rivet 14 and the broken piece of the pin 30 may be withdrawn from the nosepiece 86 preparatory to setting the next rivet.

The gun 16 may of course be actuated by air under pressure as opposed to a hydraulic fluid under pressure and the fluid pressure supplying system utilized in conjunction with the gun 16 may have any suitable manual or automatic controls (not shown).

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fluid cylinder including first and second inner and outer concentric sleeves having front and rear ends and sealingly supported relative to each other at their rear ends, a piston sleeve reciprocal relative to and nested between said inner and outer sleeves forward of the rear ends thereof with a pressure fluid chamber defined between said inner and outer sleeves behind said piston sleeve, a front support mounted across the front end of said inner sleeve for forward displacement with said piston sleeve relative to said inner sleeve and including a first workpiece engaging forward central portion, a second workpiece engaging portion supported within said inner sleeve for rearward displacement with said inner and outer sleeves relative to said central portion, and means for admitting fluid under pressure into and exhausting fluid from said chamber.

2. The combination of claim 1 including an outer spring-retaining sleeve telescoped within said inner sleeve and including a forward radially outwardly projecting portion with which the front end of said piston sleeve is abutted, a second inner spring-retaining sleeve telescoped within said outer retaining sleeve and including a rear radially outwardly projecting portion against which the rear end of said second sleeve is abutted, and means biasing said inner and outer retaining sleeves forwardly and rearwardly, respectively, relative to each other.

3. The combination of claim 1 wherein said central portion defines a bore extending therethrough generally concentric with said sleeves, said second workpiece engaging portion comprising a shank-gripping jaw chuck for gripping the expanding pin or stem of a blind rivet.

4. The combination of claim 2 wherein said inner retaining sleeve includes diametrically enlarged head means on its forward end slidingly guided in said outer retaining sleeve and the latter includes radially inwardly projecting shoulder means on its rear end slidingly guided on the outer surfaces of the rear end of said inner retaining sleeve, said biasing means comprising a coiled compression spring disposed about said inner retaining sleeve between and abutted against the opposing surfaces of said head and shoulder means.

5. The combination of claim 4 wherein said central portion defines a bore extending therethrough generally concentric with said sleeves, said second workpiece engaging portion comprising a shank gripping jaw chuck for gripping the expanding pin or stem of a blind rivet.

6. A blind rivet setting hand tool comprising a body having front and rear ends and adapted to be hand-held, a carrier supported from said body for front-to-rear reciprocation relative to said body between forward and rearward limit positions and including a forwardly facing forward portion for engagement with the head of a blind rivet and having a front-to-rear extending central anhydride formed therethrough, a pin-engaging gripping assembly supported from said body behind said forward portion and operable to grip the rear end of a pin extending through said bore, means yieldingly biasing said carrier to said rearward limit position, said hand tool including fluid pressure chamber defining means operable to effect forward displacement of said carrier relative to said body toward said forward limit position thereof in response to fluid under pressure being applied to said fluid pressure chamber defining means.

* * * * *